United States Patent
Espinosa-Montalvo

(10) Patent No.: US 8,613,235 B2
(45) Date of Patent: Dec. 24, 2013

(54) CONTINUOUSLY VARIABLE TRANSMISSION

(76) Inventor: Carlos Raul Espinosa-Montalvo, Quito (EC)

(*) Notice: Subject to any disclaimer, the term of this patent is extended or adjusted under 35 U.S.C. 154(b) by 240 days.

(21) Appl. No.: 13/373,845

(22) Filed: Dec. 2, 2011

(65) Prior Publication Data
US 2013/0139619 A1 Jun. 6, 2013

(51) Int. Cl.
*F16H 1/00* (2006.01)
(52) U.S. Cl.
USPC ................................................. 74/37; 74/112
(58) Field of Classification Search
USPC .............................................. 74/37, 112, 162
See application file for complete search history.

(56) References Cited

U.S. PATENT DOCUMENTS

| | | | |
|---|---|---|---|
| 5,514,047 A | 5/1996 | Tibbles et al. | |
| 6,938,508 B1 * | 9/2005 | Saagge | 474/93 |
| 7,163,477 B1 * | 1/2007 | Sherrod | 474/14 |
| 7,427,248 B2 * | 9/2008 | Chonan | 474/93 |
| 7,648,435 B2 * | 1/2010 | Ishida et al. | 474/8 |
| 7,674,197 B2 * | 3/2010 | Aitcin | 474/19 |
| 7,690,466 B2 * | 4/2010 | Oishi et al. | 180/230 |
| 7,857,721 B2 * | 12/2010 | Ishida et al. | 474/188 |
| 8,133,149 B2 * | 3/2012 | Smithson et al. | 476/38 |
| 8,267,835 B2 * | 9/2012 | Raasch et al. | 477/44 |
| 8,281,914 B2 * | 10/2012 | Wians et al. | 192/14 |
| 8,409,039 B2 * | 4/2013 | Beyer | 474/14 |
| 8,425,364 B2 * | 4/2013 | Lahr | 475/207 |
| 8,512,203 B2 * | 8/2013 | Raasch et al. | 477/44 |

* cited by examiner

*Primary Examiner* — David M Fenstermacher

(57) ABSTRACT

A continuously variable transmission includes: an input movement, a control system, a continuously variable reciprocating movement, a first holder, a second holder, a chain, an output sprocket, and a freely rotatable sprocket. The holders having the reciprocating movement. Each of the holders having a linearly movable teeth. The movable teeth are perpendicularly movable to the reciprocating movement. Each of the movable teeth having an internal end and an exposed end. The exposed end having a first slope and a second slope. The first slope having a greater slope than the second slope.

3 Claims, 1 Drawing Sheet

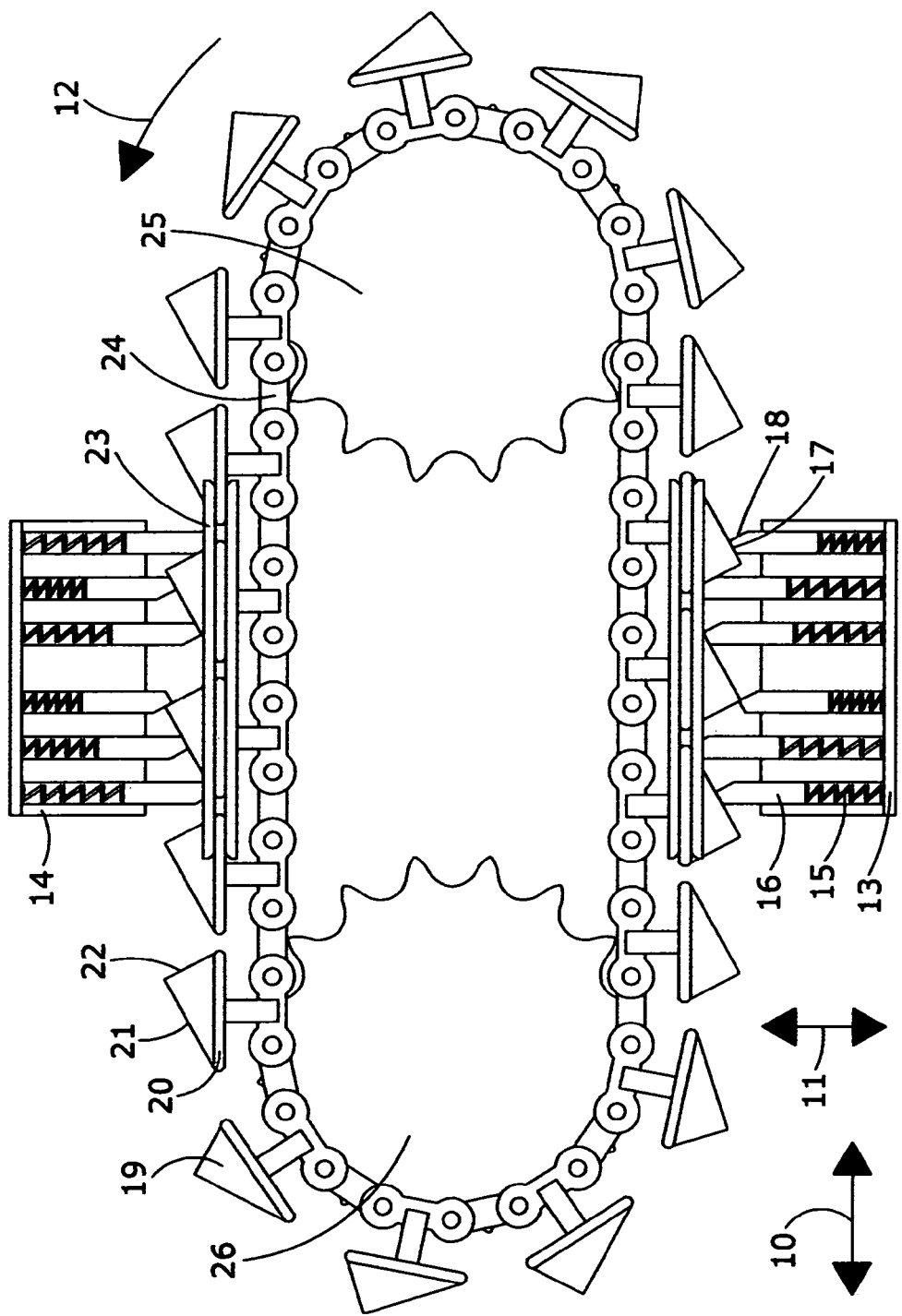

CONTINUOUSLY VARIABLE TRANSMISSION

BACKGROUND OF THE INVENTION

This invention relates to continuously variable transmissions.

Continuously variable transmissions transmit movement between an input and an output motion using a control system for determining the ratio of speed or torque.

BRIEF SUMMARY OF THE INVENTION

A continuously variable transmission is provided. The continuously variable transmission includes: an input movement; a control system; the input movement defines a continuously variable reciprocating movement with the control system; a first holder and a second holder; the holders having the reciprocating movement; each of the holders having a plurality of linearly movable teeth; the plurality of movable teeth are perpendicularly movable to the reciprocating movement; each of the movable teeth having an internal end and an exposed end; each of the plurality of movable teeth having a spring on the internal end; the exposed end having a first slope and a second slope; the first slope having a greater slope than the second slope; a chain driving an output sprocket and a freely rotatable sprocket; a stationary supports are located symmetrically between the output sprocket and the freely rotatable sprocket on both sides of the chain; the first holder and the second holder are facing the stationary supports; the chain having a plurality of outwardly extending teeth and a plurality of outwardly extending connectors; each of the plurality of teeth is uniformly distributed along the chain; each of the plurality of connectors is located between the chain and each of the plurality of teeth; each of the plurality of teeth having the first slope and the second slope; some of the plurality of teeth are facing and contacting the plurality of movable teeth on the stationary supports; the plurality of movable teeth are configured and positioned within the holders, for the reciprocating movement, at least one of the plurality of movable teeth is frictionally engaged with at least one of the plurality of teeth; one of the holders and the chain having a relative movement when at least one of the plurality of movable teeth having an inwardly movement within the holder contacting some of the plurality of teeth; and wherein one of the holders and the chain having an interlocking feature when at least one of the plurality of movable teeth having a frictional engagement contacting some of the plurality of teeth, and the chain having an output movement.

These and other features and advantages of the invention will become apparent to those skilled in the art upon review of the following drawing, the detailed description, and the appended claims.

BRIEF DESCRIPTION OF THE DRAWING

FIG. 1 is a view of a continuously variable transmission according to the embodiments of the present invention.

DETAILED DESCRIPTION OF THE INVENTION

The following description is merely exemplary in nature and is not intended to limit the present disclosure, application, or uses.

FIG. 1 is a view showing a continuously variable reciprocating movement 10, and a perpendicularly movement 11 to the movement 10, and an output movement 12. The reciprocating movement 10 is modified by a control system (not shown). The reciprocating movement 10 is transmitted to a first holder 13 and a second holder 14. A springs 15 and a movable teeth 16 are used within the holders 13 and 14. Each of the movable teeth 16 is connected to each of the springs 15 allowing the movement 11 in the holders 13 and 14. Each of the movable teeth 16 has an external end formed by a slope 17 and a slope 18. The slope 18 is greater than the slope 17. A chain 24 is connected to an output sprocket 25 and a freely rotatable sprocket 26. The chain 24 has a connectors 20 and a teeth 19. Each of the teeth 19 is formed by a slope 21 and a slope 22. The slope 22 is greater than the slope 21. The holders 13 and 14 are facing a stationary supports 23. The stationary supports 23 are located symmetrically between the output sprocket 25 and the freely rotatable sprocket 26 on both sides of the chain 24.

Some of the teeth 19 are facing and contacting the movable teeth 16 on the stationary supports 23. The movable teeth 16 are configured and positioned within the holders 13 and 14, for the reciprocating movement 10, at least one of the movable teeth 16 is frictionally engaged with at least one of the teeth 19.

One of the holders 13 and 14, and the chain 24 have a relative movement when at least one of the movable teeth 16 has an inwardly movement within the holder contacting some of the teeth 19; the inwardly movement is parallel to the movement 11.

One of the holders 13 and 14, and the chain 24 have an interlocking feature when at least one of the movable teeth 16 has a frictional engagement contacting some of the teeth 19, and the chain 24 has the output movement 12, which is transmitted to the output sprocket 25.

Accordingly, the reader will see that the continuously variable transmission of this invention can be used with several types of applications and configurations for transmitting input and output velocities.

The description of the invention is merely exemplary in nature and variations that do not depart from the gist of the invention are intended to be within the scope of the invention. Such variations are not to be regarded as a departure from the spirit and scope of the invention.

What is claimed is:

1. A continuously variable transmission comprising: an input movement; a control system; said input movement defines a continuously variable reciprocating movement with said control system; a first holder and a second holder; said holders having said reciprocating movement; each of said holders having a plurality of linearly movable teeth; said plurality of movable teeth are perpendicularly movable to said reciprocating movement; each of said movable teeth having an internal end and an exposed end; each of said plurality of movable teeth having a spring on said internal end; said exposed end having a first slope and a second slope; said first slope having a greater slope than said second slope; a chain driving an output sprocket and a freely rotatable sprocket; a stationary supports are located symmetrically between said output sprocket and said freely rotatable sprocket on both sides of said chain; said first holder and said second holder are facing said stationary supports; said chain having a plurality of outwardly extending teeth and a plurality of outwardly extending connectors; each of said plurality of teeth is uniformly distributed along said chain; each of said plurality of connectors is located between said chain and each of said plurality of teeth; each of said plurality of teeth having said first slope and said second slope; some of said plurality of teeth are facing and contacting said plurality of movable teeth on said stationary supports; said plurality of movable teeth are configured and positioned within said holders, for said reciprocating movement, at least one of said plurality of movable teeth is frictionally engaged with at least one of said plurality of teeth; one of said holders and said chain having a relative movement when at least one of said plurality of movable teeth having an inwardly movement within said holder contacting some of said plurality of teeth; and wherein one of said holders and said chain having an interlocking feature when at least one of said plurality of movable teeth having a frictional engagement contacting some of said plurality of teeth, and said chain having an output movement.

2. The continuously variable transmission of claim 1 wherein said first slope has a coefficient of friction that is higher than that of said second slope.

3. The continuously variable transmission of claim 1 wherein said stationary supports further have a bearings for linear motion of said chain with said plurality of teeth.

* * * * *